United States Patent

[11] 3,584,881

[72] Inventors Karen B. Goodkind
Los Angeles;
Brett B. Hamilton, Malibu; Ake L. Larsson, Redondo Beach; Jimmie L. Wittington, Manhattan Beach, all of, Calif.

[21] Appl. No. 783,952
[22] Filed Dec. 16, 1968
[45] Patented June 15, 1971
[73] Assignee Mattel, Inc.
Hawthorne, Calif.

[54] INDEXING DEVICE FOR A SOUND REPRODUCING TOY
10 Claims, 5 Drawing Figs.

[52] U.S. Cl. 274/9
[51] Int. Cl. G11b 3/00
[50] Field of Search 274/1, 9, 15

[56] References Cited
UNITED STATES PATENTS
3,383,114 5/1968 Ryan 274/2

*Primary Examiner*—Harry N. Haroian
*Attorney*—Seymour A. Scholnick

ABSTRACT: An indexing mechanism for a string-wound, spring-driven phonograph record member having interleaved grooves with lead-in portions circumferentially spaced about a peripheral portion thereof includes clutch means for connecting the record member to the drive means for reverse rotation when the string is pulled to rewind the motor until the record member is stopped by stop means for locating a predetermined lead-in portion adjacent the initial position of the tone arm at which time the clutch means slips permitting continued pulling of the drawstring while the record member remains stationary.

INVENTORS
KAREN B. GOODKIND
BRETT B. HAMILTON
AKE L. LARSSON
JIMMIE L. WHITTINGTON

BY Max E. Shirk
ATTORNEY

INVENTORS
KAREN B. GOODKIND
BRETT B. HAMILTON
AKE L. LARSSON
JIMMIE L. WHITTINGTON

BY Max E. Shirk
ATTORNEY

INDEXING DEVICE FOR A SOUND REPRODUCING TOY

BACKGROUND OF THE INVENTION

1. Field of the Invention

The present invention relates to a sound reproducing apparatus and, more particularly, to a sound reproducing device of the type incorporable in a toy, capable of selectively reproducing a selected one of a plurality of recorded sayings.

2. Description of the Prior Art

The use of sound reproducing devices in toys, in order to produce talking toys, is well known. Typically, such a sound reproducing device, which is concealably mounted in the toy, includes a disclike record in which a plurality of discrete sound sequences, hereafter referred to as sayings, are recorded in separate, independent grooves. The device generally includes a drawstring or pull cord which a child may pull to wind a power spring. Once the drawstring is released by the child the power spring unwinds, causing the record to rotate while a stylus, supported in a tone arm, engages one of the grooves. The stylus produces mechanical signals which are used in an associated diaphragm, to produce the desired audio signals or sounds, which together create the saying, recorded in the particular groove.

Herebefore, most of the known sound reproducing devices operated so as to reproduce the sayings either in a fixed sequence or at random. Sequential reproduction is achieved by providing generally complex positioning control mechanisms, which control the relative positions of the tone arm with respect to the record, so that the stylus engages the grooves on the record in a predetermined fixed sequence. For example, in U.S. Pat. Nos. 3,168,318 and 3,282,590, the primary inventive features relate to mechanisms which are used to successively position or index the tone arm with respect to a multigroove record, so that, as the child repeatedly pulls the drawstring, the tone arm engages successive grooves on the record. In U.S. Pat. No. 3,245,688, a novel sound reproducing device is disclosed in which the reproduction of sayings in a fixed sequence is achieved by successively controlling the position of the turntable on which the record is supported with respect to a defined tone arm position by means of a turntable indexing mechanism. The sound reproducing device disclosed in the latter-mentioned patent may also be operated without the turntable indexing mechanism so that the sayings may be reproduced in a random, rather than a fixed sequence.

Although toys in which sayings are reproduced in either fixed or random sequences are quite entertaining, their educational value is very limited, since the saying which is reproduced bears no relationship to any act, performed by the child. The only act which the child performs is that of pulling the drawstring which is used to wind the power spring to store the energy necessary to rotate the record and reproduce a saying once the drawstring is released. Thus, a need exists for a sound reproducing device in which the reproduced saying bears a relationship to an act, performed by the child.

A device with such a capability may, for example, be used in conjunction with a toy bank to teach a child to distinguish between coins of different denominations, by reproducing a specific saying when a coin of a specific denomination is placed in a particular slot, corresponding thereto while producing other sayings when a coin of the specific denomination is placed in any of a plurality of slots other than the slot corresponding thereto.

OBJECTS AND SUMMARY OF THE INVENTION

A primary object of the present invention is to provide a sound reproducing device capable of reproducing a selected one of a plurality of sayings.

Another object of the present invention is the provision of a new sound reproducing device in which a saying, out of a plurality of reproducible sayings, is reproduced which has a direct relationship to a specific art.

A further object of the present invention is the provision of a new turntable indexing mechanism, in a sound reproducing device, to control the sequence in which a plurality of sayings are reproduced to be a function of a corresponding sequence of acts.

These and other objects of the invention are achieved by providing, in a sound reproducing device of the type mountable in a toy, a novel turntable indexing mechanism which enables the turntable to be selectively indexed with respect to a tone arm, as a result of an act or step, performed by a child, so that the saying which is reproduced audibly informs the child whether the performed act represents a proper or correct step. The novel sound reproducing device may be incorporated in a unique toy bank having a plurality, for example, four slots. The four slots may be associated with coins of denominations of 1 cent 5 cents 10 cents and and 25 cents. When a penny is properly placed in the 1 slot, representing a proper act, and the drawstring is pulled, the turntable is so indexed with respect to the tone arm so that when the drawstring is released a saying is reproduced which audibly indicates to the child that the proper act was performed. For example, the saying may be, "You correctly inserted a penny in the penny slot." On the other hand if the child places a penny in any of the other slots, representing an improper act or step, the penny located in an improper slot causes the indexing of the turntable with respect to the tone arm to reproduce a saying which audibly informs the child that the coin was inserted in the wrong slot. For example, the insertion of a penny in the nickel slot may result in the reproduction of a saying, "you incorrectly inserted a penny in the nickel slot."

The novel sound reproducing device of the present invention includes a unique clutch arrangement which enables the proper indexing of the turntable with respect to the tone arm when the drawstring is pulled, hereafter referred to as the Rewind operation or simply, Rewind, while at the same time enabling the power spring to be fully wound. Then, when the drawstring is released representing the start of the saying reproduction or Play, the clutch arrangement operates in a novel way to mechanically lock the rewinding power spring to the turntable to insure the proper rotation of the record for proper saying reproduction.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
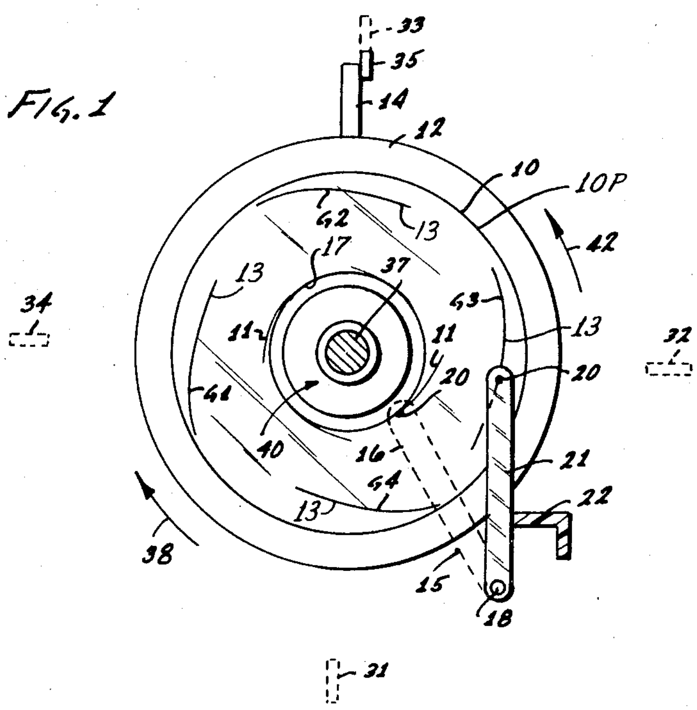
FIGS. 1 and 2 are simplified top and side cross-sectional views of a sound reproducing device, useful in explaining the present invention.

The basic principles of the sound reproducing device, incorporating the novel turntable indexing mechanism of the present invention, may best be explained in conjunction with FIG. 1 wherein reference numeral 10 designates a multigroove disc or record in which sayings are recorded in individual, interleaved grooves. For explanatory purposes the number of interleaved grooves is limited to four. They are designated by G1—G4. In the FIGURE, only the lead portions (lead-in portions 13 and lead-out portions 11) of the grooves and a common end convolution 17 are shown. It is apparent from FIG. 1 that the lead-in portions 13 are circumferentially spaced about the periphery 10P of record 10. The record 10 is shown supported on a turntable 12 having a tab 14 extending outwardly from its periphery. In the FIGURE, dashed line 15 represents a tone arm 16 pivotally mounted about pin 18. Dashed line 15 represents the tone arm at the end of PLAY, i.e., after the reproduction of a saying when a stylus 20 supported by the arm is engaged in the common end convolution 17.

Once a saying is reproduced or replayed, the reproduction of another saying may be accomplished by returning the tone arm 16 to a fixed start position as indicated by solid line 21, in which the arm is shown abutting a stop member 22, while at the same time winding up a power spring, which is used to store the energy necessary to rotate the record 10 by rotating the turntable 12 once the drawstring is released. In accordance with the teachings of the present invention, and in the particular arrangement shown in FIG. 1, a plurality of turntable indexing positions 31—34 are provided about the periphery of the turntable 12, one position being associated with each groove on the record. The positions are designed so that a stop member 35 may be inserted at the start of Rewind in any one of them. The function of member 35, which may be a coin or the like, is to engage the turntable tab 14 as the turntable 12 is rotated during Rewind thereby stopping the rotational motion of the turntable at a desired point, which controls which groove the stylus engages when the tone arm is in its start position.

Figure 2:
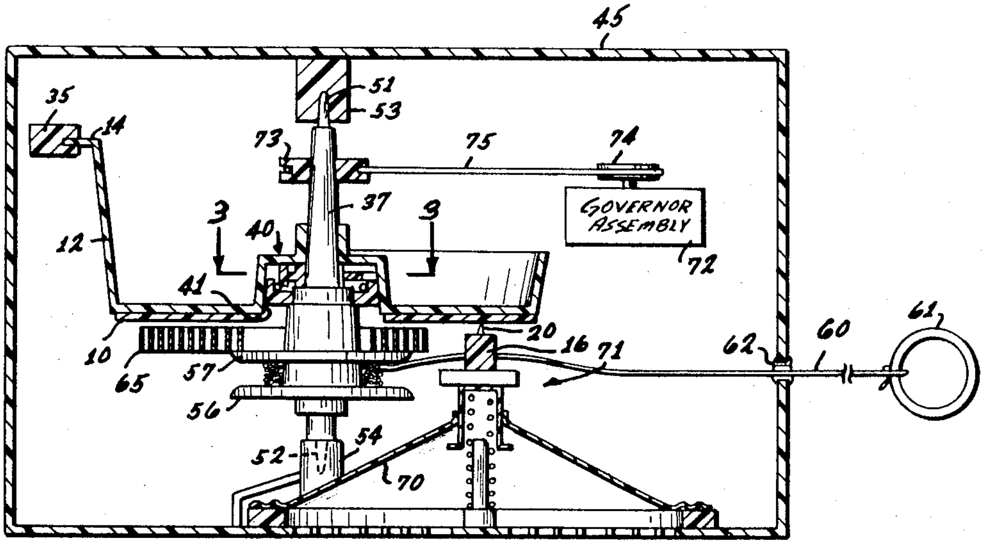

In the example diagrammed in FIG. 1, the stop member 35 is assumed to be inserted at position 33, before or right at the start of Rewind, i.e., before or as soon as a drawstring such as drawstring 60, shown in FIG. 2, is pulled. As the string is pulled, several parts move to their start of play positions. These include the tone arm 16 which pivots to its start position. Also, a spring spindle 37 to which one end of the drawstring is tied is caused to rotate in clockwise direction indicated by arrow 38. As a spindle 37 rotates clockwise, it winds up a power spring connected thereto.

A clutch arrangement 40 is located in an axial cavity 41 in turntable 12. As will be explained hereafter in detail, the spring spindle 37 is coupled to the turntable 12 by the clutch arrangement 40, which, in Rewind, causes the turntable 12 to rotate with the rotating spring spindle 37 in the clockwise direction as long as tab 14 does not engage the stop member 35. Once the tab 14 engages the stop member 35, the turntable and the record thereon are inhibited from rotating any further. Thus, the groove which the stylus engages when the tone arm is in its start position is controlled by the indexing position at which the tab 14 is engaged.

In the example, diagrammed in FIG. 1, the stylus 20 is shown engaging groove G3 when stop member 35 is in position 33. Clearly, if member 35 were inserted in position 32, the turntable would rotate an additional one-quarter turn, so that the stylus 20 would engage groove G2. Either of grooves G1 and G4 would be engaged if the stop member 35 were inserted in positions 31 and 34, respectively. In the present invention, it is assumed that grooves G1—G4 have recorded therein sayings which, when audibly reproduced, relate to the insertion of the stop member 35 in positions 31—34, respectively.

Once the turntable 12 is stopped at one of the indexing positions, the clutch arrangement 40 operates as a slip clutch to enable the spring spindle 37 to continue to rotate as the drawstring continues to be pulled until the power spring is fully wound. Then, when the drawstring is released the power spring begins to unwind, causing the spindle 37 to rotate counterclockwise as represented by arrow 42. When rotating counterclockwise, the clutch 40 fixedly engages the turntable 12 with the spindle 37 causing the former, and the record thereon, to also rotate counterclockwise. It is during this part of the operation, i.e., during Play, that the saying is audibly reproduced.

It should be pointed out that once Play begins, it is necessary to withdraw the stop member 35 so that the turntable 12 is free to rotate the necessary number of revolutions, required for a complete saying reproduction. Otherwise, the tab 14 would, after nearly one complete counterclockwise revolution, engage the stop member 35 once more which would prevent the turntable to freely and uniformly rotate in the counterclockwise direction.

It should be appreciated that the number of indexing positions has to equal the number of grooves or sayings on the record 10 so that a specific saying is audibly reproduced when the turntable is stopped or indexed at a specific position, to which the reproduced saying is related. Although in FIG. 1, the record 10 is shown containing only four grooves (G1—G4), associated with four indexing positions (31—34), it should be apparent that any record may contain any number of grooves *n*, where *n* is an integer, in which case the turntable 12 may be stopped or indexed at any one of *n* indexing positions to reproduce a saying, related to the indexing position.

It should further be pointed out that in the present invention, since the reproduced saying is selected be selecting the indexing position, at which the turntable is stopped, the same saying may be reproduced repeatedly by repeatedly stopping the turntable at the same indexing position. Thus, the sequence in which the sayings are reproduced is neither fixed nor independently random. Rather, the sequence is one which is a function of the sequence of indexing positions at which the turntable is stopped in a sequence of Rewind steps. For example, if in a sequence of eight Rewind steps the turntable 12 were stopped at positions 31, 31, 33, 32, 32, 34, 31, 34, the sequence of reproduced sayings would consist of the sayings in grooves G1, G1, G3, G2, G2, G4, G1 and G4.

For a more complete description of the present invention as related to the novel turntable indexing arrangement, reference is again made to FIG. 2 which is a cross-sectional diagram of a toy housing 45 in which a sound reproducing device, incorporating the principles of the present invention, is positioned. In FIG. 2, elements like those previously described are designated by like numerals.

As may be seen from FIG. 2, power spindle 37 has ends 51 and 52 rotatably mounted in bosses 53 and 54, respectively. The bosses are fixedly supported in housing 45. Supported in spindle 37 above end 52 are a pair of spaced apart discs 56 and 57 which together form a pulley or arbor designed to contain drawstring 60, one end of which is tied to the spindle 37. The other string end terminates in a ring 61, located outside the housing 45. The string 60 extends to the housing exterior, through an eyelet 62 in the housing 45. The power spindle 37 is connected to one end of a spiral windable power spring 65, whose other end (not shown) is fixedly connected to the housing 45.

As is appreciated by those familiar with the art, the power spindle, power spring 65 and drawstring 60 cooperate in such a way that when the string, which at the end of Play is wrapped around spindle 37, is pulled outwardly by a playing child, the spindle rotates in a first direction, for example, clockwise, causing spring 65 to be wound up. This occurs during Rewind. In the present invention, as the spindle 37 rotates during Rewind, in the clockwise direction, the clutch arrangement 40 mechanically couples the turntable 12 thereto so that the turntable also rotates in the clockwise direction. However, once the turntable tab 14 engages stop member 35 at any of the indexing positions, the turntable 12 is prevented from further rotation, with the clutch, thereafter acting acting as a slip clutch to enable the spindle to continue to rotate in the clockwise direction even though the turntable 12 has been stopped or indexed at the desired indexing position. This is necessary in order to fully windup spring 65, to store sufficient energy therein required for turning the turntable 12 and the record thereon during Play.

Then, when the string is released, i.e., during Play, the power spring unwinds, causing the spindle 37 and the turntable 12 to rotate in an opposite direction, for example, counterclockwise, so that the released string 60 is pulled into the housing and becomes wound up in the arbor, defined by discs 56 and 57. When the spindle 37 rotates in the counterclockwise direction, the clutch 40 is fully engaged, so as to mechanically lock the turntable 12 to the spindle 37 thereby causing the former to also rotate in the counterclockwise direction. It is during this period which represents the Play cycle that the saying, recorded in the groove in which the stylus 20 is engaged, is reproduced.

In the sound reproducing device of the present invention, it is assumed that as the drawstring 60 is first pulled during Rewind, it first engages the tone arm 16 raising it from record 10 to disengage the stylus 20 from the common end convolution such as convolution 11 on record 10. The pulled drawstring also pivots arm 16 to its start position. The manner in which this is accomplished is well known, one example being described in the above-referred to U.S. Pat. No. 3,245,688. Consequently, it will not be described herein in any added details.

As is appreciated, the actual sound is produced by a sound producing cone, generally designated in FIG. 2 by numeral 70. Cone 70 together with tone arm 16 and the stylus 20 form a tone arm assembly which is designated in FIG. 2 by numeral 71. Preferably, the spindle 37 is coupled to a governor assembly whose function is to regulate the rotation of the turntable 12 during Play to insure proper and uniform sound reproduction. Since such a governor assembly is well known, the governor assembly of the sound reproducing device of the present invention is simply represented by a block 72. Pulleys 73 and 74 fixedly secured to spindle 37 and assembly 72, respectively provides the coupling therebetween by means of a belt or O-ring 75.

Figure 3:
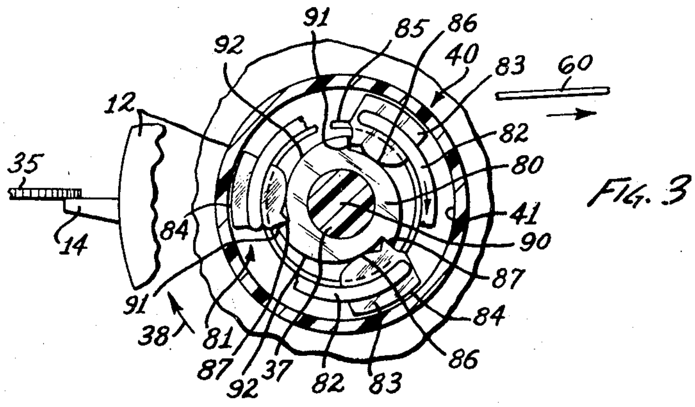
FIGS. 3 and 4 are two cross-sectional views of a novel clutch arrangement, the views being taken along lines 3–3 in FIG. 2.

Reference is now made to FIG. 3 which is a cross-sectional diagram along lines 3–3 in FIG. 2. The diagram is particularly useful to describe the novel clutch arrangement 40, with elements like those previously described being designated by like numerals. The clutch arrangement 40 includes a first clutch element 80 which is fixedly connected to the spindle 37, and a second clutch element 81 formed by a plurality of interconnected arms 82, each one of which carries a block member or simply block 83. The interconnections between the arms 82 are purposely deleted in order to simplify the diagram. The portion of the turntable 12 which defines the cavity 41 in which the clutch arrangement 40 is located may be thought of as the third clutch element. For explanatory purposes, unit 81 is shown including three blocks 83.

Each block 83 has an exterior surface 84 which is designed to engage the inner surface of the third clutch element, i.e., the turntable 12. To insure engagement between the two, the clutch arrangement preferably includes a snap ring 85 which provides each of the blocks 83 with a radially, outwardly directed force. The inner side of each block 83 is shaped to form a circumferential camming surface 86 and a substantially radially directed camming surface 87, the radial directions being with respect to the center 90 of spindle 37. When element 81 consists of the blocks 83 the first clutch element 80 defines a first set of three substantially radial camming surfaces 91 and a second set of three circumferential spiralling camming surfaces 92.

In operation, during Rewind, as the spindle rotates in the clockwise direction (arrow 38), the first clutch element 80 continuously rotates therewith. At some point during the first clockwise revolution cam surfaces 91 engage the radial cam surfaces 87 of blocks 83, providing rotational forces thereto. Any radial force is very small and therefore may be neglected. Consequently, the second clutch unit 81 starts to rotate in a clockwise direction. The radial force which is supplied to blocks 83 by the snap ring 85 is sufficient to cause their surfaces 84 to frictionally engage the turntable 12 with sufficient force to cause the turntable 12 to also rotate in the clockwise direction. Thus, all three clutch elements rotate in the clockwise direction.

The turntable 12, representing the third clutch element, continues to rotate in the clockwise direction until its tab 14 engages the stop member 35. Once this occurs, the turntable 12 stops from rotating any further. The rotational force applied by unit 80 to the blocks 83 is greater than the radial force applied thereto by ring 85. Consequently, the blocks 83 continue to rotate, with their surfaces 84 sliding or slipping with respect to the inner surface of the turntable 12. Alternately stated, during this point in the operation, the clutch arrangement operates as a slip clutch, until the drawstring is fully drawn and the power spring 65 is fully wound.

Figure 4:
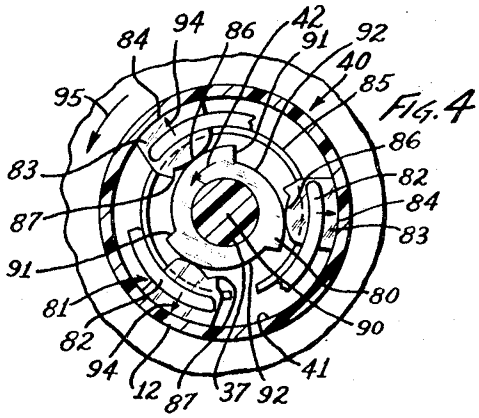
Figure 5:
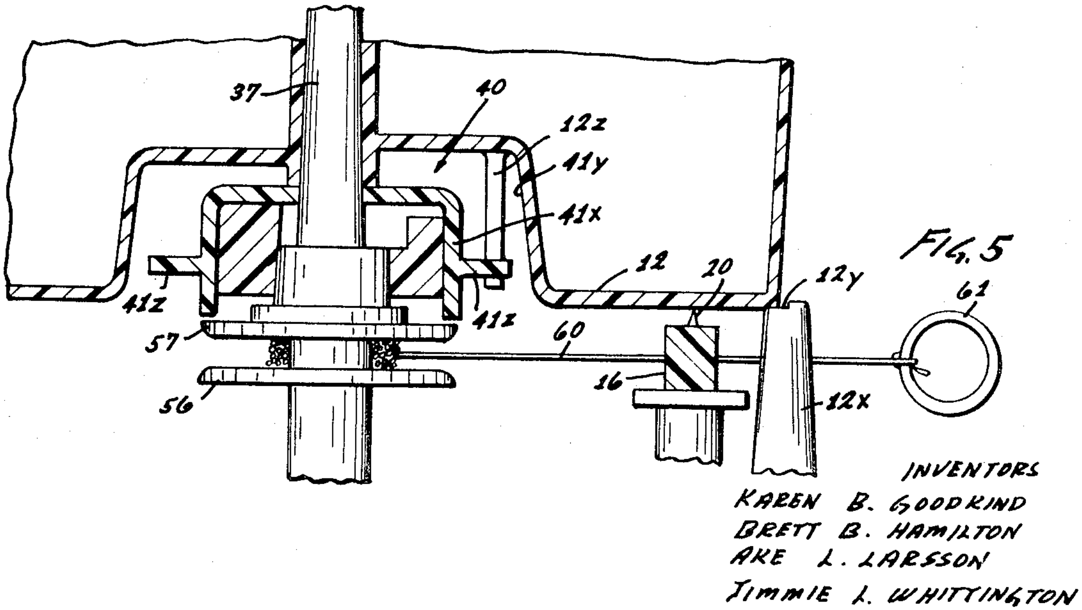
FIG. 5 is a partial cross-sectional view of another embodiment of the invention.

Then, during PLAY, when the power spring 65 unwinds, it causes the spindle and the first clutch element 80 to rotate in the counterclockwise direction, as indicated by arrow 42 in FIG. 4, which is another cross-sectional diagram of the clutch arrangement 40. Each cam surface 92 of unit 80 has a radial distance from center 90 which is greater than the radial distance of a portion of the cam surface 86 of a block 83. Consequently, as the element 80 rotates counterclockwise, these surface portions engage one another. When contact is made between the two, cam surfaces 92 apply to surfaces 86 rotational as well as radial forces. The rotational forces are sufficient to cause blocks 83 to rotate counterclockwise together with unit 80. The radial forces represented by arrows 94 have magnitude sufficient to cause surfaces 84 to frictionally engage the turntable 12 without slipping. Consequently, the turntable 12 starts to rotate in the counterclockwise direction, as shown in FIG. 4 by arrow 95.

From the foregoing it should thus be appreciated that the novel clutch arrangement 40 provides the sound reproducing device of the present invention with the capability of indexing, i.e., stopping the turntable 12 at any desired indexing position during Rewind, so that during PLAY, a saying, which is related to or associated with the position at which the turntable was stopped, is reproduced. The clutch arrangement may be thought of as a two-way clutch except that in Rewind, after the turntable is properly indexed, it also acts as a slip clutch.

Although herebefore the invention has been described in connection with a turntable 12 with a single tab 14, it should be appreciated that the turntable 12 may incorporate a plurality of tabs, at different positions about its periphery, as well as at different axial positions. Each tab may be engageable by a stop member inserted in any one of the indexing positions associated therewith.

Summarizing the foregoing description, in accordance with the teachings of the present invention, a novel sound reproducing device is provided in which a unique turntable indexing arrangement is included, with which the turntable may be selectively indexed at any one of a plurality of positions during Rewind so that a saying, out of a plurality of recorded sayings, which is associated with the particular selected indexing position may be reproduced. Clearly, since the sayings are associated with the indexing positions, the sayings may be reproduced in any desired sequence by indexing the turntable at positions, selected to be in a corresponding sequence.

A novel clutch arrangement, herebefore described in conjunction with FIGS. 3 and 4, provides the capability of the selective indexing or positioning of the turntable to control the saying which is reproduced.

In the foregoing description it has been assumed that the clutch arrangement 40 is located in the axial cavity 41 of the turntable 12 (see FIGS. 3 and 4). Consequently, as soon as the ring 61 is released and the string 60 is slackened, the main spindle 37 starts to rotate, and nearly simultaneously therewith, the clutch engages the table 12. Since by releasing the ring 61, the slackened string 60 also enables the stylus to engage the record on table 12, a likelihood, though remote, exists that unless the ring is properly released to permit the stylus to quickly engage the record before the latter starts turning, the turntable may in fact start to rotate before the stylus is in proper engagement with a record thereon. This would result in a reproduction of a wrong saying. To overcome such likelihood, in another embodiment of the invention, the axial cavity in which the clutch arrangement 40 is located is formed by a separate unit other than the turntable. This separate unit, the turntable and the stylus coengage in a way to insure that the turntable starts to rotate during PLAY only after the stylus engages a selected groove of a record, supported thereon.

The manner in which these elements coengage may best be explained in conjunction with the partial cross-sectional view of FIG. 11 wherein elements, like those previously explained, are designated by like numerals. As shown therein, the clutch arrangement 40 is located in an axial cavity formed by a cup-shaped unit 41$x$ which is axially aligned within a larger size axial cavity 41$y$ in turntable 12. The table which in FIG. 11 is shown in the Rewind cycle or before PLAY, is shown supported near its periphery on a table-support unit 12$x$, at its upper surface 12$y$.

In this particular embodiment, when the ring 61 is released and the string 60 is slackened, the spindle 37 starts to rotate, causing the clutch arrangement 40 to engage unit 41$x$ to cause the latter to rotate with the spindle. Unit 41$x$ has one or more radial outwardly directed protuberances 41$z$ which are designed to engage a protuberance 12$z$ inwardly extending from cavity 40 of table 12. Only when one of protuberances 41$z$ engages protuberance 12$z$ does table 12 start to rotate during PLAY. These protuberances are located so that the unit 41$x$ generally rotates a portion of a revolution before table 12 is engaged for rotation. The time required for such a partial revolution is sufficient for stylus 20 of unit 16, which is biased toward table 12, to engage the record on the turntable and bias the table away, such as upwardly, from surface 12$y$. Consequently, the stylus engages the desired groove of the record on the turntable, which at this point is still stationary, even though the spindle 37 and unit 41$x$ are already turning.

From the foregoing, it should thus be appreciated that in the embodiment diagrammed in FIG. 11, when the ring 61 is released at the start of PLAY, the table 12 remains stationary for a portion of a revolution to provide sufficient time for the stylus to engage the proper groove of the record on the stationary table. Only thereafter, is the turntable engaged to rotate and thereby cause the saying reproduction.

Although particular embodiments of the invention have been described and illustrated herein, It is recognized that modifications and variations may readily occur to those skilled in the art.

We claim:

1. In a sound reproducing device for use in a toy or the like including:

A. a record member movably mounted on said device and having recorded thereon a plurality of discrete sound sequences, arranged to be separately reproduced;

B. driving means mounted on said device and drivingly connected to said record member for moving said record member in a first direction an amount to reproduce any one of said sound sequences, individually;

C. movable sound reproducing means on said device mounted for engaging said record member, when said movable sound reproducing means is in a first position, for reproducing one of said discrete sound sequences recorded thereon, as said record member is moved in said first direction and said movable sound reproducing means remain in engagement with said record member while moving from said first position to a second position;

D. record member indexing means for selectively indexing said record member to control the point of engagement thereof with said movable sound reproducing means when the latter is in said first position, thereby to control the discrete sound sequence out of said plurality of sequences which is reproduced;

E. energy storing means for moving said driving means in said first direction with energy stored in said energy storing means to drive said record member in said first direction to reproduce a selected one of said discrete sound sequences; and F. manually operable means for moving said driving means in a second direction for storing energy in said energy storing means, the improvement comprising:

clutch means coupled to said driving means for selectively engaging said record member to move it in said second direction, said indexing means including means for controlling the amount said record member is moved in said second direction, thereby to control the point of engagement of said record member with said movable sound reproducing means when the latter is in said first position.

2. In a sound reproducing device for use in a toy or the like, the arrangement comprising:

a record member movably mounted on said device and having recorded thereon a plurality of discrete sound sequences, arranged to be separately reproduced;

driving means mounted on said device and drivingly connected to said record member for moving said record member in a first direction an amount to reproduce any one of said sound sequences, individually;

movable sound reproducing means on said device mounted for engaging said record member, when said movable sound reproducing means is in a first position, for reproducing one of said discrete sound sequences recorded thereon, as said record member is moved in said first direction and said movable sound reproducing means remain in engagement with said record member while moving from said first position to a second position;

record member indexing means for selectively indexing said record member to control the point of engagement thereof with said movable sound reproducing means when the latter is in said first position, thereby to control the discrete sound sequence out of said plurality of sequences which is reproduced; energy storing means for energizing said driving means with energy stored therein to drive said record member in said first direction to reproduce a selected one of said discrete sound sequences;

manually operable means for storing energy in said energy storing means;

said manually operable means including means for moving said energy storing means in a second direction opposite said first direction to store energy therein, said means for moving including clutch means for selectively engaging said record member to move it in said second direction an amount controlled by said record member indexing means thereby to control the point of engagement of said record member with said movable sound reproducing means when the latter is in said first position;

said first and second directions being a first direction of rotation and a second direction of rotation opposite said first direction, respectively, said energy storing means comprising a windable power spring and said manually operable means including a rotatable member coupled to said spring;

a drawstring coupled to said rotatable member for winding up said spring by rotating said rotatable member and said spring in said second direction when said drawstring is drawn to store energy in said spring, sufficient to cause said spring to unwind when said drawstring is released, to rotate said record member in said first direction, said clutch means being coupled to said rotatable member for controlling the rotation of said record member in said second direction an amount, controlled by said record member indexing means without impeding the continued rotation in said second direction of said rotatable member and spring coupled thereto, to store sufficient energy therein, said clutch means including means for securely engaging said rotatable member to said record member when said spring rotates said rotatable member in said first direction to continuously rotate said record member therewith;

said record member being supported for rotation on a turntable, said record member indexing means including means for engaging said turntable at any one of a plurality of positions about its periphery to control the rotation of said turntable and the record member supported thereon in said second direction; and said record member indexing means including at least one tab extending from said turntable for engaging a stop member in any one of a plurality of positions.

3. In a phonograph toy having a first member movable in first and second opposite directions of rotation and a second member movable in said first and second opposite directions of rotation, an arrangement for controlling the relative motions of said first and second members, comprising:

a first clutch element fixedly coupled to said first member to move therewith in said first and second directions;

a second clutch element disposed between said first clutch element and said second member, said second clutch element being engageable by said first clutch element as said first clutch element moves in said first and second directions, said second clutch element, when moving in said first direction, applying a force in a selected direction to said second member to cause said second member to move in said first direction until said second member is inhibited from moving in said first direction by a second force applied thereto, with said second clutch element continuing to move in said first direction together with said first clutch element, said second clutch element when moving in said second direction effectively coupling said first clutch element to said second member to continuously move the latter in said second direction as said first member is moved therein;

said first clutch element having at least one first surface portion which engages said second clutch element when said first clutch element rotates in the first direction to apply to said second clutch element a substantially rotational force so as to cause the second clutch element to rotate in said first direction without subjecting it by said first clutch element to a radial force, said second clutch element having at least one first surface in engagement with said second member, as a function of a radial force, sufficient to maintain said at least one first surface thereof in frictional engagement with said second member to cause the latter to rotate in said first direction until its rotation is inhibited by a second force, with said at least one first surface of said second clutch elements slipping with respect to said stopped second member, each of said first and second clutch elements having at least one second surface portion which is engageable when said first clutch member rotates in said second direction to effectively mechanically lock said first and second members together so that said second member continuously rotates in said second direction together with said first member; and said first member comprising a power spring spindle of the type rotatable in said first direction to wind up a power spring coupled thereto, said power spring spindle rotating in said second direction when said power spring is enabled to unwind, and said second member comprising a turntable for supporting a record member having at least one sound sequence recorded thereon which is reproduced when said record member is rotated, the turntable rotating in said second direction.

4. A sound reproducing device as recited in claim 3 wherein said first and second directions are a first direction of rotation and a second direction of rotation opposite said first direction, respectively, said energy storing means comprising a windable power spring connected to said driving means and said manually operable means includes a drawstring coupled to said driving means for winding up said spring by rotating said driving means in said second direction when said drawstring is drawn to store energy in said spring.

5. A sound reproducing device as recited in claim 3 wherein said record member includes circumferentially spaced lead-in grooves and is supported for rotation on a turntable and wherein said means for controlling the amount said record member is moved in said second direction includes means for engaging said turntable at any one of a plurality of positions about its periphery to control the rotation of said turntable and the record member supported thereon in said second direction.

6. In a phonograph device including:

A. a record member having interleaved grooves with lead-in portions circumferentially spaced about a peripheral portion thereof;

B. drive means coupled to said record member for rotating said record member in a first direction;

C. sound reproducing means engageable with said grooves for reproducing sounds recorded therein, said sound reproducing means including a tone arm member having an initial position adjacent said peripheral portion of said record member; and D. indexing means for controlling the rotated position of said peripheral portion with respect to said initial position of said tone arm member, the improvement comprising:

i. first control means connected to said drive means to reverse said drive means to reverse said drive means for rotating said record member in a second direction opposite to said first direction; and ii. second control means connected to said drive means for interrupting rotation of said record member in said second direction when a predetermined lead-in groove portion arrives at a position adjacent said initial position of said tone arm member.

7. The improvement stated in claim 6 wherein said second control means includes:

slip clutch means connected to said drive means for breaking the coupling between said record member and said drive means when said record member encounters a predetermined resistance; and stop means positionable in the path of travel of said record member for engaging said record member when said predetermined lead-in groove portion arrives at said adjacent position.

8. The improvement stated in claim 6 wherein said drive means includes:

a spindle;

motor means connected to said spindle for imparting rotation thereto; and clutch means connecting said spindle to said record member.

9. The improvement stated in claim 8 wherein said motor means is a spring motor and wherein said first control means is a drawstring connected to said spindle for rotating said spindle in said second direction to wind said motor.

10. The improvement stated in claim 9 wherein said second control means includes:

slip clutch elements on said clutch means for breaking the coupling between said record member and said drive means when said record member encounters a predetermined le resistance; and stop means positionable in the path of travel of said record member for engaging said record member when said predetermined lead-in groove portion arrives at said adjacent position.